(12) United States Patent
Bucher

(10) Patent No.: US 9,366,528 B2
(45) Date of Patent: Jun. 14, 2016

(54) DRY COATING THICKNESS MEASUREMENT AND INSTRUMENT

(75) Inventor: Udo Wolfgang Bucher, Darlinghurst (AU)

(73) Assignee: WOLF INDUSTRAIL INNOVATION, Paddington (AU)

( * ) Notice: Subject to any disclaimer, the term of this patent is extended or adjusted under 35 U.S.C. 154(b) by 531 days.

(21) Appl. No.: 13/322,408

(22) PCT Filed: May 25, 2010

(86) PCT No.: PCT/AU2010/000632
§ 371 (c)(1),
(2), (4) Date: Dec. 15, 2011

(87) PCT Pub. No.: WO2010/135770
PCT Pub. Date: Dec. 2, 2010

(65) Prior Publication Data
US 2012/0084056 A1   Apr. 5, 2012

Related U.S. Application Data

(60) Provisional application No. 61/254,929, filed on Oct. 26, 2009.

(30) Foreign Application Priority Data

| May 26, 2009 | (AU) | 2009902392 |
| Jun. 30, 2009 | (AU) | 2009903058 |
| Sep. 15, 2009 | (AU) | 2009904454 |
| Oct. 14, 2009 | (AU) | 2009904991 |
| Oct. 23, 2009 | (AU) | 2009905169 |
| Nov. 10, 2009 | (AU) | 2009905487 |

(51) Int. Cl.
*G01B 11/06* (2006.01)
*G01B 11/28* (2006.01)
(Continued)

(52) U.S. Cl.
CPC ............ *G01B 11/28* (2013.01); *B05C 11/1005* (2013.01); *G01B 11/0625* (2013.01); *B05C 1/0826* (2013.01)

(58) Field of Classification Search
CPC .. G01B 11/06; G01B 11/0625; G01B 11/026; G01B 11/0616; G01B 11/0691; G01B 11/0683; G01B 11/14; B08B 7/0042; B23K 26/03; G01N 2291/02854
USPC .......... 702/155, 159, 170, 172, 179; 356/369, 356/503, 630
See application file for complete search history.

(56) References Cited

U.S. PATENT DOCUMENTS

| 3,885,066 A | * | 5/1975 | Schwenninger | ........ B05B 13/02 118/314 |
| 4,182,259 A | * | 1/1980 | Garner et al. | .................. 118/712 |
| 4,324,803 A | * | 4/1982 | Bergmann et al. | ............ 428/472 |

(Continued)

OTHER PUBLICATIONS

"Hainbuch Universal clamping system", Aug. 24, 2006, p. 22-23, http://web.archive.org/web/20060824160716/http://www.romheld.com.au/pdf/hainrot.pdf.*

(Continued)

*Primary Examiner* — Mischita Henson
(74) *Attorney, Agent, or Firm* — Barnes & Thornburg LLP

(57) ABSTRACT

Instruments for measuring and/or controlling the thickness of a coating applied to a substrate are provided. Methods for measuring the dry thickness of the coating utilizing instruments of the invention are also provided.

22 Claims, 3 Drawing Sheets

(51) Int. Cl.
*B05C 11/10* (2006.01)
*B05C 1/08* (2006.01)

(56) References Cited

U.S. PATENT DOCUMENTS

| | | | |
|---|---|---|---|
| 5,409,732 A * | 4/1995 | Leonard et al. | 427/10 |
| 5,418,349 A * | 5/1995 | Swain et al. | 219/121.84 |
| 5,757,498 A * | 5/1998 | Klein et al. | 356/630 |
| 5,800,615 A * | 9/1998 | Lambert et al. | 118/326 |
| 5,837,313 A * | 11/1998 | Ding et al. | 427/2.21 |
| 6,074,483 A * | 6/2000 | Belotserkovsky et al. | 118/665 |
| 6,092,419 A * | 7/2000 | Dixon et al. | 73/602 |
| 6,120,833 A * | 9/2000 | Bonnebat et al. | 427/10 |
| 6,128,081 A * | 10/2000 | White et al. | 356/503 |
| 6,639,673 B1 * | 10/2003 | Freund et al. | 356/369 |
| 6,794,602 B2 * | 9/2004 | Nair et al. | 219/121.6 |
| 7,094,444 B2 * | 8/2006 | Rigney et al. | 427/142 |
| 7,374,791 B2 * | 5/2008 | Flanagan | 427/2.24 |
| 2002/0131058 A1 * | 9/2002 | Luxem | 356/630 |
| 2003/0054107 A1 * | 3/2003 | Trabold | B05C 5/0254 427/355 |
| 2005/0137829 A1 * | 6/2005 | Gimelfarb et al. | 702/171 |
| 2007/0260422 A1 * | 11/2007 | Marcus et al. | 702/172 |
| 2008/0307885 A1 * | 12/2008 | Ravitch et al. | 73/597 |
| 2009/0061075 A1 * | 3/2009 | Ruglio et al. | 427/10 |

OTHER PUBLICATIONS

"A Primer on Displacement Measuring Interferometers", Jan. 1999, Zygo Corporation.*

* cited by examiner

DRY COATING THICKNESS MEASUREMENT AND INSTRUMENT

CROSS-REFERENCE TO RELATED APPLICATIONS

This application is the U.S. national phase of PCT/AU2010/000632 filed May 25, 2010. PCT/AU2010/000632 claims the benefit under the Convention of Australian Patent Application Nos. 2009902392, 2009903058, 2009904454, 2009904991, 2009905169, 2009905487 and U.S. Provisional Patent Application No. 61/254,929 filed May 26, 2009, Jun. 30, 2009, Sep. 15, 2009, Oct. 14, 2009, Oct. 23, 2009, Nov. 10, 2009 and Oct. 26, 2009 (respectively). The entire disclosures of PCT/AU2010/000632, Australian Patent Application Nos. 2009902392, 2009903058, 2009904454, 2009904991, 2009905169, 2009905487 and U.S. Provisional Patent Application No. 61/254,929 are hereby incorporated by reference.

FIELD OF THE INVENTION

The invention relates to methods for measuring the thickness of a coating on a surface of a substrate and to instruments for use in these methods. The invention has particular though not exclusive application to continuous or intermittent, essentially real time measurement of the dry thickness of the coating while the coating is being applied to the substrate on a coating production line.

BACKGROUND OF THE INVENTION

Coatings are applied in the manufacture and finishing of a vast range of goods and products including metal sheet and coil, timber flooring, automobiles, aeroplanes, fencing, glass, packaging and the like. In the area of metal sheet and coil, the substrate is typically galvanized steel, aluminium, stainless steel, or zinc alloy coated steels including aluminium-zinc and zinc-magnesium coated steels.

Devices are available to measure the coating thickness on these products to avoid costly wastage of the coating material, and to ensure the quality of the finished product. These devices include magnetic sensors, ultrasonic sensors, and mechanical-optical devices such as the commercially available DJH gauge system (DJH Designs Inc. Oakville, ON, Canada). This system involves mechanically boring a shallow crater through a painted surface into the underlying substrate of a sample. The sample is then placed under a microscope and the crater is viewed on a high resolution monitor for determination of the coating thickness. Likewise, coating thickness can be determined by sectioning a sample cut from a coated product and viewing the sample under high magnification. Other methods include the use of a micrometer to measure thickness of the coated article, stripping off the coating, re-measuring the article, and calculating the coating thickness as the difference between the two readings. However, these techniques either have limited accuracy, or they are time consuming and labour intensive. Moreover, they do not measure or monitor the thickness of the coating during the coating process.

Lasers have also been used in the past for the measurement of coating thickness, for example, as described U.S. Pat. No. 848,785 (EP 2 031 347 A1). This involves the use of a laser sensor to measure the size of the substrate before it is coated, and to monitor the coating thickness during the application/deposition of the coating to determine the end point for the coating deposition process. Similarly, US 2005/0137829 describes a thickness measurement system that utilises a laser displacement sensor which measures the distance to the surface of the substrate before and after the substrate is coated with a coating.

U.S. Pat. No. 5,757,498 describes an optical spray coating monitoring system employing a laser displacement sensor and a data acquisition system for monitoring the spray gun operator's coating application technique and determining the coating thickness. The system includes 2 lasers mounted on the spray gun itself, one of which is arranged to measure the distance to the substrate and the other of which measures the distance to the surface of the wet coating as the coating is being applied to the substrate.

U.S. Pat. No. 6,092,419 describes a system for measuring coating thickness which employs a short pulse laser for generating an ultrasound signal in a wet or dry paint film on a substrate, and a detection laser for detecting minute motions of the surface of the paint film arising from the ultrasound signal induced in the film. An interferometer is used to record modulations in the laser light pulse frequency of the detection laser for determination of the film thickness, the resonance of the paint film being directly related to its thickness.

U.S. Pat. No. 6,120,833 describes a system for measuring coating thickness utilising signals from an inductive sensor and a capacitive sensor to measure the thickness of a coating on a substrate travelling over support rolls.

U.S. Pat. No. 5,409,732 describes a method for regulating the thickness of a wet coating applied to a web substrate. This system utilises optical density sensors to measure periodic variations in the thickness of the coating on the web. An automatic controller analyses the information from the sensors and adjusts the gap between metering bar and the substrate surface to remove excess coating applied to the web substrate. Alternatives to optical density sensors are described as including beta gauge and capacitive gauge sensors, or a physical measurement of the combined web and coating thickness.

SUMMARY OF THE INVENTION

Broadly stated, the invention relates to instruments and methods for measuring and/or monitoring the thickness of a coating applied to a substrate. The thickness of the coating is determined with the use of sensor means to measure at least one dimension value to the surface of a coating and at least one dimension value to at least one reference surface, the thickness of the coating being calculated using the measured dimension values.

More particularly, in an aspect of the invention there is provided an instrument for measuring the thickness of a coating applied to the surface of a substrate, comprising:

coating removal means for removing a quantity of the coating to partially expose the surface of the substrate;

sensor means for emitting and detecting signals reflected from the surface of the coating and the exposed surface of the substrate for generation of one or more data sets consisting of data indicative of the position of the surface of the coating and the position of the surface of the substrate, the sensor means being arranged so as to be distanced from the coating and the substrate and adapted to detect the signals reflected from the surface of the substrate during relative movement between the substrate and the sensor means; and processing means for processing the data sets generated by the sensor means to determine the thickness of the coating on the substrate.

In another aspect of the invention there is provided a method for measuring the dry thickness of a coating applied to a surface of a substrate, comprising:

providing sensor means for emitting and detecting signals reflected from an outer surface of the coating and the surface of the substrate to generate one or more data sets consisting of data indicative of the position of the surface of the coating and further data indicative of the position of the surface of the substrate;

removing a quantity of the coating to partially expose the surface of the substrate;

generating the data sets using the sensor means to measure the position of the surface of the coating and the exposed surface of the substrate during relative movement between the substrate and the sensor means, the sensor means being distanced from the coating and the substrate and for the emission and detection of the signals; and processing the data sets generated by the sensor means to determine the thickness of the coating.

Typically, the position of at least one of the surface of the coating and the surface of the substrate is measured at a number of different locations on the coating and/or the substrate for the determination of the coating thickness.

Typically, at least one cavity is formed in the coating by the partial removal of the coating, the substrate surface being exposed within the cavity, and the position of the substrate surface within the cavity is measured.

Typically, the position of the surface of the coating adjacent to one or more of the cavities formed in the coating is measured.

Typically, measurements indicative of the position of the surface of the coating and the position of the substrate surface at the bottom of the cavity are collected as a single data can be obtained as separate data to the data indicative of the position of the bottom of the cavity, and these data used in the calculation of the thickness of the coating.

In particular, the position of the surface of the coating (e.g., adjacent to respective of the cavities) may be based on a series of measurements indicative of that position, and this series of measurements can be processed to determine/calculate a reference line (i.e., zero value). Mathematical methods for translating a reference line to have a zero value are known. The data processing can utilize any suitable regression or other form of analysis (e.g., linear regression analysis). The reference line may be positioned or moved upwards or downwards (e.g., as data is generated) to better reflect the actual position of the surface of the coating, to optimise the determination of the thickness of the coating The measurement of the thickness of the coating can occur subsequent to the removal of the coating or substantially simultaneously with the removal of the coating. The measurement of the thickness of the coating can occur at strip production speeds of up to 300 meters per minute, or as low as 15 meters per minute or less.

Instruments and methods embodied by the invention can be used to monitor the thickness of the coating being applied to the substrate during the coating application process (such as during a production run). That is, the dry thickness of the coating can be measured during the coating of the substrate and the measurement compared against a predetermined target reference thickness. In the event the measured thickness of the coating differs from the target thickness, one or more parameters of the coating process can be adjusted to modify the thickness of the wet coating being applied to the substrate so as to reduce the difference between the dry thickness and the target thickness.

Thus, a method embodied by the invention can further comprise:

selecting a coating reference thickness;

comparing the determined dry thickness of the coating applied to the surface of the substrate with the reference thickness; and adjusting the thickness of the wet coating applied to the substrate to reduce difference between the determined dry thickness of the coating and the reference thickness.

Typically, the position (e.g., height) of the sensor means is maintained essentially constant with respect to surface of the coating and the substrate surface for the generation of respective of the data sets in a method embodied by the invention. In some embodiments, the sensor means is moved with respect to the substrate. In other embodiments, the substrate can be moved with respect to the sensor means.

A method embodied by the invention may also comprise:

determining an optimized distance of the sensor means (e.g., one or more displacement sensors) from the coating and/or the surface of the substrate for generation of the data sets indicative of the position of the surface of the coating and the position of the surface of the substrate;

if the position of the sensor means differs from the determined optimized distance, moving the sensor means to the optimized distance from the surface of the coating and/or the surface of the substrate; and generating the data set while the sensor means is located at the optimized distance from the surface of the coating and/or the surface of the substrate.

In the above context, the optimized distance can comprise a distance range.

The signals reflected from the coating and substrate surfaces and sensed by the sensor means in at least some embodiments of the invention are electromagnetic radiation signals, and can be of any wavelength deemed suitable. The reflected signals can be continuous or pulsed signals. Generally, the signals are light beams and typically, laser light beams.

Typically, the sensor means utilised in an instrument and method of the invention comprises or consists of at least one displacement sensor for measuring the distance to at least one of the substrate surface and the surface of the coating. That is, separate displacement sensors can be used to measure the distance to the substrate surface and the distance to the surface of the coating, or both measurements can be made by the same displacement sensor. Typically, one displacement sensor is used. The displacement sensor may scan the substrate in order to measure the coating thickness at different positions across or along the substrate.

It will be understood that in some embodiments, data indicative of the position of the substrate surface at a plurality of different locations on that surface can be obtained and a single reference surface value calculated from that data.

The data forming the respective data sets may comprise discrete measurements of the position of the substrate surface and the surface of the coating, and/or an average position of one or both of those surfaces.

The predetermined target reference thickness of the coating can be a specific thickness value or a thickness range. As will be understood, the thickness of the coating being measured can be determined by comparing the difference(s) between the data indicating the position of the substrate surface and the data indicating the position of the surface of the coating.

The thickness of the coating can be determined in accordance with embodiments of the invention on any substrate deemed suitable. Typically, the substrate is a sheet material such as a sheet metal (e.g., sheet steel) with or without an existing corrosion resistant (e.g., a suitable metallic alloy) coating although, the substrate can be any manufactured article that is coated by an industrial coating process.

The term "coating" as used herein is to be taken to encompass composite coatings comprising one or more coating layers. The coating can be any coating that is amenable to determination of its thickness by an instrument and method embodied by the invention, and may be selected from a layer of paint, lacquer, varnish, plastisol, an aqueous slurry, a polymeric coating, a hot melt coating, molten polymer coating, inorganic chemical coating, conversion coating, pre-treatment coating, a metallic coating (e.g., a zinc or zinc alloy coating), and a particulate coating. When the coating is a coat of paint it can, for example, comprise a paint primer, undercoat, topcoat, clear coat, wash coat, or a combination of one or more of the foregoing.

Advantageously, one or more embodiments of the invention allow the thickness of the coating applied to the substrate to be adjusted during a production run thereby enabling variation in the thickness of the coating to be reduced and/or the thickness to be maintained substantially constant or within the predetermined target reference thickness range, as the coating is being applied to the substrate. As will be understood, this can provide not only a more uniform coating on the substrate, but also a significant reduction in the overall volume of the particular coating applied with the potential for corresponding production cost and energy savings.

The features and advantages of the invention will become further apparent from the following detailed description of exemplary embodiments of the invention and the accompanying drawings.

BRIEF DESCRIPTION OF THE ACCOMPANYING DRAWINGS

DETAILED DESCRIPTION OF EXEMPLARY EMBODIMENTS OF THE INVENTION

The following description illustrates the measurement of a paint coating in accordance with a method of the invention. However, the same principles apply to the measurement of other coating types. The substrate to which the coating is applied in a method embodied by the invention can be sheet metal strip such as galvanized steel strip, or zinc alloy coated steel strip including aluminium-zinc and zinc-magnesium alloy coated steels. The thickness of the steel substrate as well as its metallic coating can each exhibit significant thickness variation, which can occur over a short, medium or long distance, from micrometers to meters. This variability of the underlying substrate thickness is one of a number of factors that contributes to difficulty in making dynamic measurements of coating thickness during a coating process.

Figure 1:
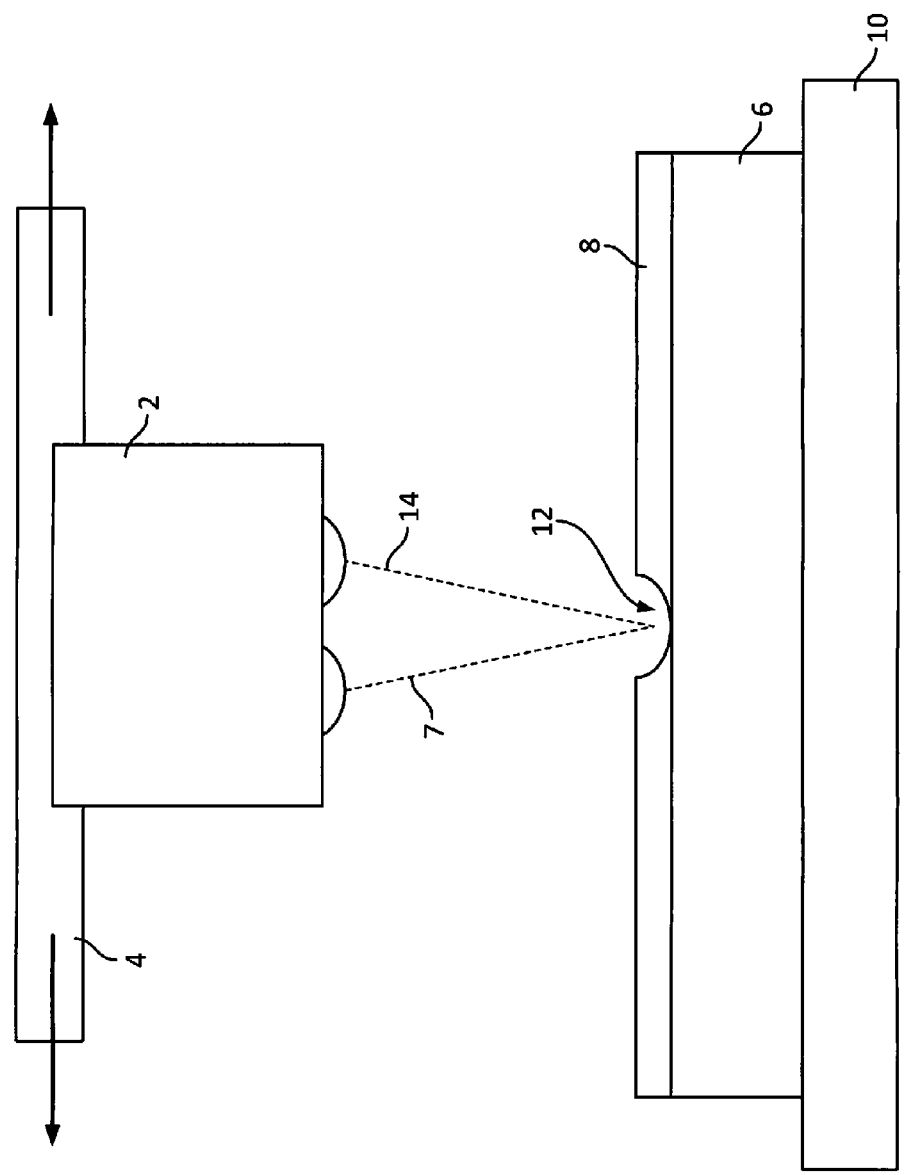
FIG. 1 is a schematic diagram showing an instrument embodied by the invention for measuring the thickness of a coating on a substrate.

FIG. 1 shows sensor means in the form of a laser displacement sensor (2) attached to a scanning stage (4) which traverses a substrate (6) provided with a coating (8) of paint. In this instance, the coated substrate (6) is held in place on a further stage (10). A cavity in the form of a groove (12) in the coating (8) has been cut with coating removal means consisting of a scribe (not shown) completely removing the full thickness of the coating to expose the surface of the substrate. The substrate in this embodiment is sheet metal strip. The scribe (or at least the cutting tip of the scribe) is fabricated from a softer material (e.g., copper) than the substrate so that essentially no substrate material is removed by the scribe. As the displacement sensor (2) traverses the coated substrate (6), a laser emitter/source of the laser displacement sensor (2) emits a laser beam indicated by the numeral (14) for measuring the distances between the displacement sensor (not shown) and both the surface of the coating (8) and the exposed surface of the substrate (6) (i.e., the reference surface in this embodiment). The laser light/beam is reflected off the surfaces of the coating and the exposed substrate to produce reflected beams indicated by the numeral (7), respective of which are detected by a laser sensor component of the displacement sensor (2). Alternatively, non-contact sensor means may be used that do not rely on, or involve the use of, a laser.

The detection of the reflected laser by the laser sensor generates a data set comprising data indicative of the position of surface of the coating and further data indicative of the position of the surface of the substrate. These distance measurements are at a minimum in the area corresponding to the full coating thickness and at a maximum at the base of the groove (12) representing no coating thickness. The thickness of coating is then calculated by processing means, comparing difference(s) in the measurements of areas of no coating (the base of the groove) and those with full coating (that is, the surface of the coating), typically by subtracting the former from the latter. The processing means can be a suitably programmed computer for effecting the processing of the data sets. As will be understood, the data sets for the determination of the thickness of the coating can be obtained by movement of the coated substrate relative to the emitted laser light or vice versa. The data sets can be subjected to mathematical processing to smooth the data representing the position of the coating surface and/or the base of the cavity.

The depth profile of the grooves, holes or pits in the coating, having been measured by the sensor means (at various times) produces a data set of sequential data representing the height/position measurements of the surface of the coating and the profile of the pits. The base of the pits represents the surface on which the coating is applied. For the purposes of describing how the processing means processes the data and determines a zero line or a baseline for the data, this surface (paint and pits sequentially) will be referred to as 'the profile'. The measurements along the profile are equally spaced longitudinally along a straight line representing the line of measurement of the profile.

The profile data set is analysed and data corresponding to the paint surface on either side of the pit features is identified and considered as a subset, called the paint surface subset. This paint surface subset will take the form of a fairly straight line that has a degree of scatter about the axis of the line. This line axis can be used as an interim reference plane, and its gradient can be readily determined by known mathematical data analysis techniques (e.g. linear regression analysis). The derived gradient is used to normalize the whole of the profile data set in order to provide a data set with an average gradient of zero. The normalized profile data set can be further transformed so that the paint surface subset has an average value of zero, however this is not essential for calculation of the coating thickness. The position of each pit can be identified because the height values for the pits fall outside the values of the surrounding paint surface. The peak value for each pit is then extracted from the normalized profile data set (by finding the data value with the largest deviation from the surrounding surface data set) and this value is subtracted from the average value of the normalized paint surface subset to give a thickness of the coating for that pit location. The actual value for the surface subset may be optionally adjusted in response to the amount of scatter about the interim reference line (because the actual coating surface has tiny undulations arising from surface roughness of the coating, and the actual position chosen as the average surface position can be subjective). Using this approach the thickness of the coating at each pit location can be measured, and an average value for a series of point thicknesses can be determined.

While in the above embodiments the coating was removed using a scribe, various other means/methods can be used to remove a quantity of the coating to expose the surface of the substrate, such as by chemical means (e.g., a chemical or chemical composition which removes the coating but is essentially inert with respect to the substrate such as methyl ethyl ketone (MEK), or by a laser beam such as that of a $CO_2$ (ablation) laser.

When a scribe or other such coating removal tool is employed to remove a quantity of the coating as described above, it is typically biased into contact with the coated substrate by a spring loaded mechanism or other suitable means to apply a controlled pressure between the scribe and the coated substrate. The cutting tip of the scribe or other such tool used to remove the coating can have an oval cross-section, or a partially circular or partially oval cross-section. The cross-section can include a substantially straight component. The scribe/tool can be an integral component of apparatus embodied by the invention for measurement of the thickness of the coating. In at least some embodiments, the coating removal means can include means for moving the scribe or other cutting tool at a controlled speed to form the groove in the coating.

In other embodiments the groove (or other cavity as described herein) can be formed in the coating as the coated substrate travels past the ablation laser during the production of the coated substrate. That is, the coating (e.g., paint) is applied to the substrate and dried by a curing or heating the paint, prior to the downstream removal of a quantity of the dried paint to essentially expose the surface of the substrate to permit the measurement of the thickness of the dried paint. When a scribe or like such cutting tool is used to form a groove in the coating, a brush or air stream can be employed to remove the coating shavings.

Different materials have different laser ablation thresholds. Hence, by using an incident laser of sufficient power (e.g., peak intensity) to ablate the coating, the surface of the underlying substrate can be exposed without loss of substrate material or damage to the substrate. That is, the use of an ablation laser for the removal of a coating, but not the substrate, exploits the different ablation thresholds for the coating and the substrate. As will be understood, this is only useful when the ablation threshold for the coating is less than the ablation threshold for the substrate. The substrate thus exposed provides a reference surface/position for measurement and determination of the coating thickness. As metal substrates can have large variations in their thickness, this approach produces reliable results essentially independently of substrate thickness variation and paint type. Thus, methods and instruments for measuring dry paint thickness in accordance with the invention may not require calibration for either the paint type or the substrate type. The use of a laser (in ablation mode and/or for the purpose of measuring coating thickness) allows coating ablation and coating thickness measurements to be achieved while the sheet steel strip (i.e., the substrate) is travelling at high production speeds in excess of 200 meters per minute. The laser can be a pulsed laser that provides short pulses of energy to ablate the coating. This creates a series of holes, pits or cavities in the coating.

For example, after the coating has been cured or dried on the substrate, a small portion of the coating is removed across an area of less than 1 $mm^2$ using a $CO_2$ ablation laser. Typically, a $CO_2$ ablation laser employed in an embodiment of the invention has an output power in a range of from between about 10 watts and 100 watts and most usually, between 10 watts and 60 watts. Most typically, a 25 W to 60 W $CO_2$ laser will be employed. For the purpose of description, the cavity in the coating is referred to as a hole (or pit). This hole is created while the substrate (the coated metal strip) is travelling at production speeds. The coating removal is complete down to the metal substrate surface, but essentially without removal of any of the substrate. Measurement of the position of the base of the hole (i.e., the surface of the substrate within the hole), and the coating's surface immediately adjacent the hole (equating to the top of the hole) is accomplished by projecting a laser beam so that the hole will traverse across the laser beam with the travel of the metal strip, and detecting the reflection of the laser beam from the surface of the coating and the surface of the exposed substrate within the hole as described above. The generated data set comprising the data indicative of the position (i.e., distance from the laser sensor) of the surface of the coating at the top of the hole and the data indicative of the position of the base of the hole (the exposed substrate surface) is again processed to calculate the thickness of the coating. A sensor other than a laser sensor may be used to measure the hole depth/coating thickness, for example a confocal light sensor may be employed.

Measurements of the surface of the coating and the hole are generally made at sensor frequencies of at least 2.5 kHz or greater, more usually at least about 10 kHz, 30 kHz or 50 kHz and most usually, in a range of from at least 10 kHz to 100 kHz enabling a high sampling rate (e.g., up to 100,000 times per second or more). The holes formed in the coating with an ablation laser as described herein will generally have a diameter or width of about 300 μM (i.e., 0.3 mm), 250 μM or 150 μM or less. Typically, the diameter or width of the holes is nominally between about 100 μM and 300 μM, and normally about 180 μM.

Values of coating thickness along and transversely across the moving strip can be made using this method employing processing means for the purpose of characterizing the coating thickness on the substrate. The coating thickness characterization data is then used to control one or more parameters of the coating process upstream in the process line to reduce any difference between the measured coating thickness value(s), and the target reference coating thickness value. The measured thickness values can also be used to calibrate or provide a reference value for an instrument located on the paint coater (e.g., roll paint applicator) that is arranged to measure the thickness of the wet paint being applied to the substrate by the coater/applicator.

Usually, the laser light reflected from the surface of the coating and/or the surface of the exposed substrate that is detected by the sensor is provided by a separate laser source from that used to ablate the coating.

In continuous coating processes and particularly for coating uncoiled steel strip, the production line can be provided with one or more accumulators respectively comprising, for example, a plurality of rolls about which the strip passes wherein alternate ones of the rolls are moved away from the remaining rolls, drawing the strip under tension into a serpentine like shape in which form the strip remains until it passes from the accumulator as the rolls are moved back into their original position ready to receive the next strip of coated substrate. Such accumulator systems are well known in the art. In a particularly preferred embodiment, the production line can be fitted with two accumulators, one before the coating station and the other after a drying/curing oven for drying the coating. This allows for new coils of the substrate to be loaded on the entry end of the production line and the removal of finished coils (prepared by recoiling the coated substrate) at the exit end of the production line essentially without interruption of the coating process.

In at least some embodiments, the thickness of the dry coating can be determined while the strip is retained momentarily stationary after the curing/drying oven by the accumulator. For example, an ablation laser can be used to form a transverse groove or series of cavities at least part way across the strip to expose the surface of the substrate. Data indicative of the position of the surface of the coating and the surface of the substrate can then be generated with the use of a displacement sensor as described above. The ablation laser (or other coating removal means) and the displacement sensor can be mounted on a carriage or stage which traverses the strip to form the groove(s) or cavities in the coating and to generate the data. By generating the data in this way, a thickness profile of the coating at least part way (and preferably across essentially the entire width of the strip) can be determined. In the event the measured thickness of the coating differs from the target reference thickness, the operational parameters of the upstream coating applicator can be adjusted to correct the thickness of the coating being applied to the strip.

The above described method and instrument can also be applied to coating thickness measurement of a sample of the coated substrate removed from the production line after the coating has been dried. That is, the thickness of the coating that is measured can be that of the dried paint film on a sample of the substrate cut from the coated product. In this instance, the sample is held fixedly in place during the partial removal of the coating and subsequent laser scanning/sensing to characterize the coating thickness.

Moreover, in at least some embodiments as described above, the laser light source (e.g., the ablation laser) and the laser sensor can be combined into one unit.

Figure 2:
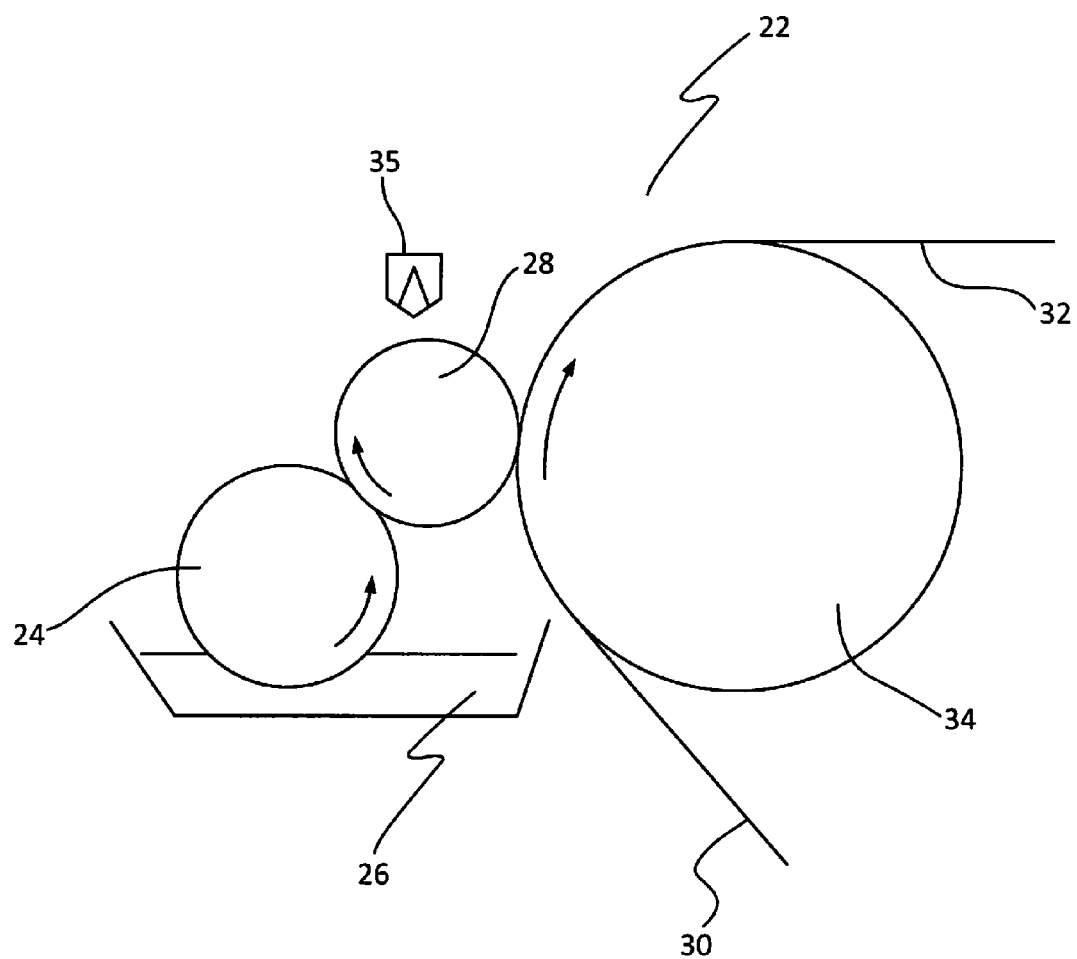
FIG. 2 is a schematic diagram of a roll coating applicator for coating metal strip.

Apparatus for monitoring and/or controlling paint film thickness applied to a substrate such as sheet steel strip is described below with reference to FIG. 2 showing a roll paint applicator (22).

The roll applicator (22) comprises a precision metal paint pick-up roll (24) (also known as a metering roll) arranged to pick-up paint from a paint tray (26) and transfer the paint to a counter rotating coating roll (28) having an outer coating/contact surface formed from polyurethane (or other suitable plastics or rubber type material). The coating roll (28) applies the paint to the substrate being coated, in this instance essentially flat steel strip (30) with a zinc-aluminium protective coating to produce a coated strip (32). The steel strip is unrolled from a pre-coiled roll of the strip (not shown) and fed around a support roll (34) under tension to provide essentially constant positioning of the strip (30) for application of the paint to the strip by the coating roll. To apply the paint, either the paint applicator is moved to bring the coating roll (28) into contact with the moving steel strip or the support roll is moved to bring the strip into contact with the coating roll. While in the embodiment shown a paint tray is provided, any suitable method for providing the paint to the pickup roll (24) can be utilized.

The paint (or other coating) can be dried, set or cured during the coating process by passing the coated section of the steel strip through a UV or electron beam curing station, or a furnace or drying oven set at the requisite temperature, that is located downstream of the roll applicator on the production line or other such apparatus for applying the coating to the substrate.

There are many configurations of roll paint applicators using different arrangements of rolls. However, the adjustment(s) needed to alter the wet paint coating thickness of such roll paint applicators for providing the required dry paint thickness on the substrate are known in the art. For example, reducing the contact pressure between the coating roll (28) and the pick-up roll (24) will result in a higher film thickness, as will increasing or decreasing the rotational velocities of the pick-up roll (24) and the coating roll (28) relative to one another. That is, the thickness of the layer of paint transferred to the coating roll (28) by the pick-up roll (24) is proportional to the rotational velocity of one relative to the other. In particular, once the paint thickness is determined on one of the rolls (24, 28) of the roll applicator (22), the corresponding paint thickness on the other of the rolls (24, 28) (as well as the thickness of the paint applied to the strip (30) can be determined using formula known in the art. In this regard, as the paint is metered through the nip between the two rolls, the paint coating is divided ("split") between those rolls to the exit side of the nip point. The split in paint thickness between the two rolls is proportional to the relative rotational velocity of each roll as described above and in some instances may be influenced, typically only slightly, by the surface roughness of the rolls. Moreover, the thickness of the wet paint coating applied to the strip (30) is a function of the speed of the strip/rotational velocity of the coating roll (28), and the applied thickness of the wet paint to the strip can, for example, be increased by increasing the rotational velocity of the coating roll (28) or decreasing the speed of the strip. Formula defining this coating thickness and speed relationship are also known.

Thus, the paint coat parameter settings of the paint applicator can be adjusted as necessary to modify the wet paint film thickness on the pick-up roll (24) or coating roll (28) that corresponds to a target dry paint film thickness on the substrate.

For example, the logic of software in an automated coating thickness measurement system embodied by the invention may compare the determined dry paint film thickness, and the required target dry film thickness. If there is no difference (providing for an allowed tolerance range) no action is taken and the measurements and comparison are repeated after a predetermined time interval. If a difference to the target thickness is detected, one or more further measurements of the dry paint film are obtained and compared. If the difference to the target thickness remains, control parameters of the roll applicator are adjusted to alter the thickness of the wet paint coat applied to the substrate. The process of measurement and comparison of coating thickness values is repeated throughout the coating process.

The drying cycle (e.g., temperature and drying period) and the drying method employed (e.g., near infra-red radiation (IR) or medium IR, induction heating, catalyst driven, convection or forced convection heating and the like) are selected for the respective coating being applied.

Respective of the displacement sensors used in an embodiment of the invention can independently be any non-contact such sensor deemed suitable and employ continuous or pulsed electromagnetic waves within or outside the visible spectrum (e.g., an infra-red wavelength) to provide data indicative of the position of the reference surface and the position of the surface of the coating.

The displacement sensors themselves may incorporate processing means for processing the generated data or transmit the data to processing means (e.g., a spreadsheet or a suitable software program) for the processing of the data. Respective of the displacement sensor(s) employed in the measurement of the thickness of the relevant coating can have a measuring range up to ±5 mm and more usually, ±2 mm or ±1 mm. For instance, a displacement sensor having a measurement range of ±1 mm and a midpoint optimal distance from the surface of the coating or substrate for generating measurement data of 25 mm, the sensor can be positioned in a range of from 24 mm to 26 mm from the coating or substrate.

At the optimal distance of the displacement sensor from the surface of the coating or substrate, the width or diameter of the beam of electromagnetic radiation (e.g., laser light) emitted onto the coating or substrate by the sensor will desirably be at least about 55% less than the width of the cavity formed in the coating as described herein and usually, about 60%, 65%, 70%, 75%, or 80% less than that of the cavity. For example, in the instance the width of the cavity is 180 µM, the width of the beam of electromagnetic radiation emitted from the displacement sensor onto the surface of the exposed substrate within the cavity is desirably 25 µM to 30 µM. For a displacement sensor with a measuring range of ±1 mm and an optimal distance from the exposed surface of the coating or substrate of 25 mm for generation of data as described herein, the width of beam of the sensor at its measurement range extremities of 24 mm and 26 mm is generally larger, and typically up to about 80 µM. Hence, the effective "measurement area" of the displacement sensor is less than the width/diameter of the cavity and the greater the difference. Moreover, the greater the difference between the cavity width and width of the "measuring spot" of the sensor, the better the measurement resolution obtained.

As the thickness of the metal strip substrate (for instance) can vary from one coil of the strip to another, a fixed displacement sensor height may result in non-optimal measurements of the distance of the sensor from the surface of the substrate or other relevant reference surface. To correct for this, the distance of the displacement sensor from the reference surface or each substrate can be adjusted so that the sensor is optimally positioned for generation of measurement data. In at least some embodiments, the position of the sensor can be adjusted automatically by position adjustment means such as by a mechanical/electrical positioning mount to which the sensor is fitted. In particularly preferred forms, the measurements generated by the sensor itself can be used to determine the optimal position or height of the sensor from the relevant surface. For example, for a displacement sensor with an optimal measuring distance from the substrate of 25 mm and a measuring range of ±1 mm, the optimal position of the sensor from the coated substrate is 25 mm less target reference coating thickness. Hence, for a substrate with a 100 µM (0.1 mm) target reference coating thickness, the optimal distance of the displacement sensor from the substrate for generation of measurement data is 25 mm-0.1 mm which equals 24.9 mm. If at commencement of the measurement of the position of the surface of the respective substrate it is determined by the sensor that the position of the surface from the sensor is greater or less than 24.9 mm, the position of the sensor is adjusted by the position adjustment means to be essentially within 24.9 mm from the substrate.

In addition, respective of the displacement sensors may be aligned with the cavity or cavities in the direction of relative movement between the sensor and the coating by the sensor position adjustment means, or by alignment means provided for this purpose. Typically, the displacement sensor(s) are aligned with the cavity or cavities in the longitudinal direction of travel of the substrate. For example, when a series of aligned holes are formed in the coating as described herein, a displacement sensor for generating data indicative of the position of the surface of the substrate is positioned to be in alignment with those holes so as to scan the exposed surface of the substrate within each hole one after the other with relative movement between the sensor and the substrate. To assist alignment, rather than the cavities having a substantially circular profile they may be in the form of ovals, ellipses or lines with their major axis orientated transversely (preferably perpendicularly) to the longitudinal axis of the substrate. In this instance, the transverse dimension of respective of the cavities is generally greater than 0.18 mm. Likewise, when the cavity is a longitudinally directed groove, the sensor is aligned to scan along the groove by the sensor position adjustment means or other alignment means. Once longitudinally aligned with the cavity or cavities, the displacement sensor may be locked in this position. The position of optimal longitudinal alignment of the displacement sensor may, for instance, be determined by scanning the substrate with the sensor across a predetermined reference angle while the substrate is moved in the longitudinal direction. As above, distance measurements to the surface of the substrate generated by the displacement sensor over the reference angle can be employed to automatically determine the optimal position of longitudinal alignment and operate the alignment means to set the sensor in that position.

In at least some embodiments, a laser sensor is provided which is positioned at an angle to the horizontal plane for generation of data and generally, within a range of from 5° to 20° from horizontal and preferably, about 12° from horizontal. Such an arrangement of the sensor has been found useful for measurement of both the surface of reflective metallic substrate within cavities formed in the coating as described herein and the less reflective surface of the coating adjacent the cavities. Moreover, by arranging the displacement sensor in this way, the sensor detects a more diffuse reflected signal.

Figure 3:
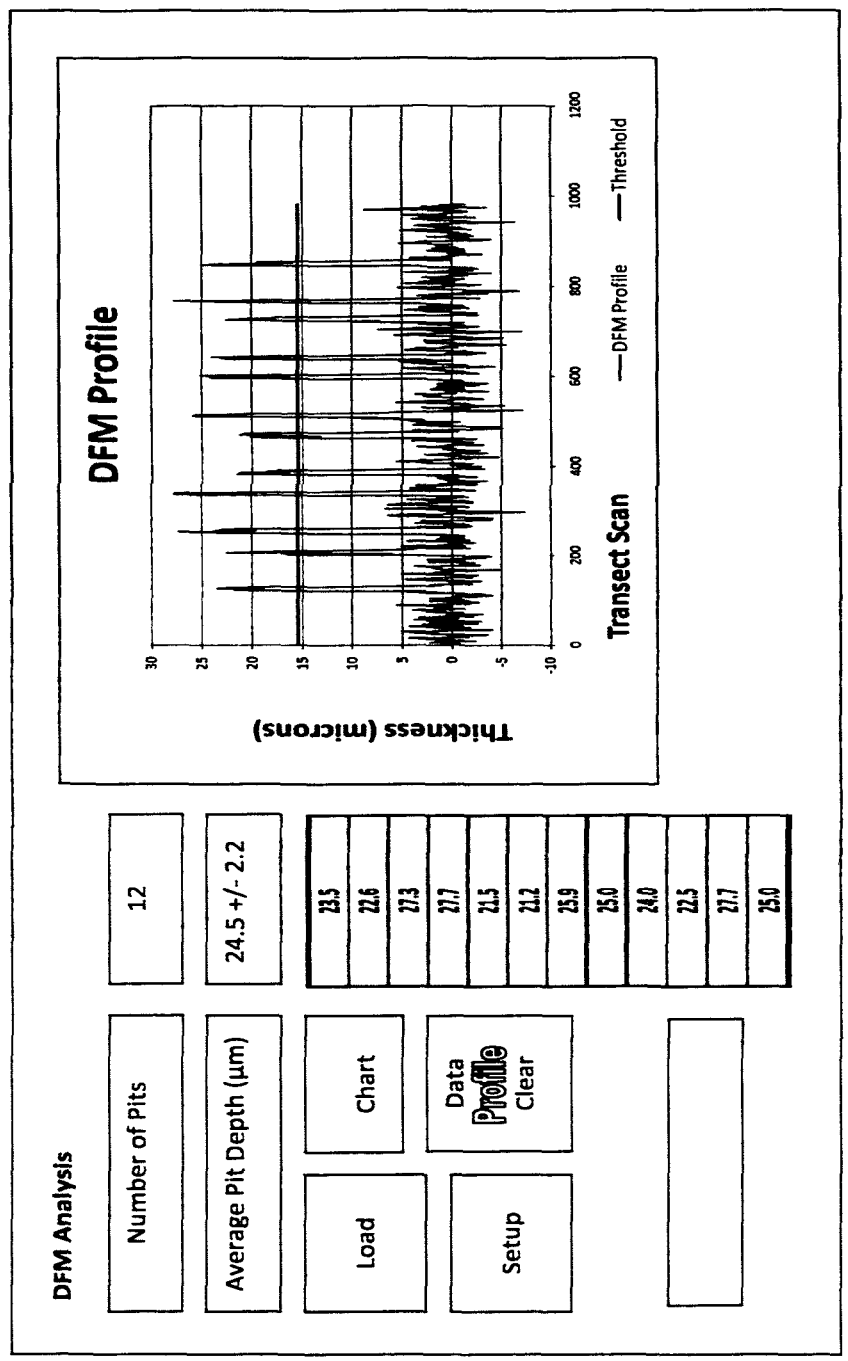
FIG. 3 is an on-line representation of a user interface showing a graph indicating the thickness of a paint coating applied to a steel strip substrate.

A spreadsheet representation showing a graph indicating the thickness of a paint coating applied to a steel strip substrate is shown in FIG. 3. The graph is a representation of the data collected by the sensor. It was obtained by measuring the position of the coating surface and the exposed surface of the substrate within a series of 12 aligned holes (pits) formed in the coating by an ablation laser. The peaks represent the metallic surface of the substrate within the holes. The measurements of the coating between the holes represent the surface of the coating. The values between the holes are averaged to provide data indicative of the average position of the coating surface between the holes. The data representing the surface of the paint has been transposed to align with a zero value reference line by application of linear regression analysis of the data. Other forms of data manipulation/analysis can be used to achieve the same result.

For any single hole the maximum value (peak position) within the hole is determined using simple logic. In particular, a hole can be recognized by a simple arithmetic test. For example, in this case any data points of greater value than a nominal threshold value of 15 µM are indicative of a hole in the coating. Nominal threshold values can be selected based on the known target thickness of the coating. Any data that is greater than 15 µM is recognized as a hole, and the maximum value within that hole is determined and recorded. The threshold expected width of the pits is known or can be measured for any given laser ablation set up. The average value representing the position of the coating surface on each side of the hole is determined. The position of the data representing the coating surface between the holes can be readily determined as the position (spacing) and the width (diameter) of the holes is known or can be determined from the data. The average value for the surface of the coating between the holes can be set as a 'zero' or a reference value as in the present example. A hole depth is calculated for each hole by subtracting the reference value (which is 'zero' in this example) from the maximum hole depth value for each hole. The hole depth equals the coating thickness at that measurement point along the coating. The individual values of coating thickness at each hole can then be averaged along the section of the coated substrate. In this example the average coating thickness was determined to be 24.5 µM with a standard deviation of ±2.2 µM. For the purpose of the calculations, a base line representative of the average position of the surface of the substrate can be obtained from the generated data and employed in the calculation of the coating thickness. This process can then be repeated to determine the depth of a further series of downstream holes in the coating produced by the ablation laser to provide a moving average of the depth of the coating as the strip or other substrate travels past the displacement sensor.

Typically, a displacement sensor employed in a method of the invention will measure the distance to the reference surface and/or the surface of the coating as described herein to within a tolerance of ±1 µM and more usually, to within a tolerance of ±0.1 µM.

Typically, the substrate (i.e., sheet metal strip) travels at a speed relative to the displacement sensor(s) in a range of from about 10 meters per minute to 220 meters per minute while the data sets for determination of the thickness of the applied coating are obtained and most usually, in a range between about 20 meters per minute and 200 meters per minute.

Typically, the paint coating is applied to the substrate to have a thickness when dried, of about 40 µM or less, usually in a range of from about 20 µM to 40 µM and more usually, about 25 µM. However, the thickness of the paint is dependent on the paint type and the end product use. For example, plastisols are typically applied at a thickness of greater than 80 µM while backing coats are typically applied at a thickness of from about 5 to about 12 µM.

Further, in embodiments for measuring dry paint thickness as described herein it is not necessary to form a continuous groove along the entire coating such as with a scribe to generate data indicative of the surface of the substrate. Instead, one or a series of short grooves in the coating can be formed or a series of aligned holes can be formed in the coating by pulsed bursts of an ablation laser over a predetermined length of the coating as described above. Hence, the position of the surface of the coating in the spaces between the cavities and the position of the surface of the exposed substrate within consecutive cavities can be measured with travel of the substrate to determine the thickness of the coating. The cavities (e.g., grooves, holes or pits) in the coating can be formed along an edge margin of the substrate (e.g., steel strip) that becomes a cladding overlap region in use of the end coated substrate product or is otherwise obscured from view, or not exposed in the product or in the end use of the coated product. Typically, the holes and subsequent measurements are made in a region where the strip is in a generally stable position such as over a fixed process/support roll, desirably with minimal eccentricity and bearing tolerances. Ideally the eccentricity of the support roll will be less than 500 µM, more usually less than 350 µM. In some embodiments, the eccentricity of the support roll may be as low as 250 µM, 150 µM or 50 µM or less.

Nevertheless, the substrate in many instances is subject to some underlying movement (e.g., due to roll eccentricity, "bouncing" of the substrate, and/or other causes) that is not a reflection of change in coating thickness or variation in the uniformity of the coating surface due to ribbing. This movement in the substrate can be characterized and accounted for in the processing of the data generated to calculate thickness of the coating, generally by establishing a base line or reference value which compensates for the movement of the substrate surface. In at least some embodiments, the base line or reference value can be determined by processing the generated data indicative of the surface of the substrate to obtain an average position of the substrate surface over a predetermined reference period or distance.

To minimize such underlying movement, the substrate (e.g., uncoiled steel strip) can be maintained under high tension and data for determination of coating thickness generated while the substrate is supported on one or more support rolls over or about which the substrate travels. The displacement sensor(s) can also be securely mounted on a vibration/shock resistant stage or mounting(s) to maintain the set distance and angle(s) (e.g., relative to horizontal) of the sensor(s) relative to the coating and substrate. Any tolerances in movement of the sensor(s) and/or the substrate are minimized. Typically, the level of sturdiness and vibration retardation with regard to the mounting of the displacement sensor(s) renders any unintended or unwanted movement of the sensor(s) essentially negligible and preferably to 1 µM or less and more preferably, to about 0.3 µM or less.

Generally, the data utilized in the calculation of the overall coating thickness in a method embodied by the invention are averaged values for a given length of the substrate that are obtained during a continuous coating process. The use of averaged data enhances the resilience and integrity of the data.

While embodiments of the invention have been described in the context of applying a coating to metal (e.g., uncoiled steel) strip such as for being roll formed into roofing or fencing panels with a waveform cross-sectional profile (e.g., corrugated or saw-tooth profiles), steel or aluminium strip or the like can also be coated with paint having a controlled thickness for fabrication of other products such as slats for venetian blinds, cool room panels, and panels for fabrication of white goods and appliances, motor vehicle parts, and a myriad of other items. Moreover, methods and instruments/apparatus embodied by the invention can be used to measure the thickness of coatings other than paint and the invention is not limited thereto.

Apparatus such as a paint/coating production line or roll applicator for applying the relevant coating to the substrate, that includes an instrument embodied by the invention or is otherwise provided in combination with an instrument as described herein, is also expressly encompassed by the invention.

Although a number of embodiments have been described, it will be appreciated by persons skilled in the art that numerous variations and/or modifications may be made without departing from the spirit or scope of the invention as broadly described. The present embodiments are, therefore, to be considered in all respects as illustrative and not restrictive.

The invention claimed is:

1. An instrument for measuring the thickness of a coating, the instrument comprising:
 coating removal means for removing a width greater than 100 µM of a coating continuously applied to a surface of a moving substrate to partially expose the surface of the substrate and form a groove in the coating;

sensor means for measuring the groove at a sequence of locations along the groove by emitting and detecting signals reflected from a surface of the coating and from the exposed surface of the moving substrate for generation of data indicative of the exposed surface of the moving substrate and the coating during relative movement between the moving substrate and the sensor means; the sensor means measuring the groove while the groove is in a stable position over a support; and processing means for processing the data generated by the sensor means to determine the thickness of the coating applied to the surface of the moving substrate and using the determined thickness to adjust the coating continuously applied if the coating continuously applied is not within a desired range of thickness.

2. The instrument according to claim 1 adapted to measure the position of at least one of the surface of the coating and of the surface of the moving substrate at a number of different locations on the coating and/or the moving substrate for the generation of the data.

3. The instrument according to claim 1 wherein the coating removal means is adapted to form the groove in the coating and the sensor means is arranged to detect signals reflected from the surface of the moving substrate exposed within the groove for generation of the data.

4. The instrument according to claim 3 wherein the coating removal means comprises an ablation laser for forming the groove in the coating.

5. The instrument according to claim 4 wherein the ablation laser is adapted to form a plurality of grooves in the coating, the grooves being in the form of an aligned series of holes or pits within the coating.

6. The instrument according to claim 1 wherein the data comprise average values indicative of the position of the surface of the coating and/or of the position of the surface of the moving substrate.

7. The instrument according to claim 1 wherein the sensor means comprises a displacement sensor with adjustment means for adjusting the height of the displacement sensor relative to the surface of the coating and/or the surface of the moving substrate for optimizing the height of the displacement sensor for measurement of the position of the respective said surface.

8. The instrument according to claim 1 wherein the sensor means comprises at least one laser displacement sensor for emitting and detecting the signals.

9. The instrument according to claim 1 wherein the sensor means is adapted to detect signals reflected from the surface of the moving substrate while the moving substrate is travelling at a speed in a range of from 10 to 220 meters per minute.

10. The instrument according to claim 1 wherein the moving substrate comprises metal strip and the coating comprises paint.

11. The instrument according to claim 1, the support comprising a roll supporting the continuously moving substrate.

12. The instrument according to claim 11, the roll operating with eccentricity less than 500 μM.

13. A method for measuring a thickness of a coating applied to a surface of a moving substrate, the method comprising the steps of:

continuously coating a continuously moving substrate;
exposing a surface of the continuously moving substrate by providing a groove in the coating by removing a width of from 100 μM to 300 μM of the coating;

providing a sensor emitting signals and detecting signals reflected from an outer surface of the coating and the exposed surface of the continuously moving substrate at a sequence of locations along a line to generate data indicative of a position of the surface of the continuously moving substrate and further data indicative of a position of the surface of the coating located along the line before and after the exposed surface of the continuously moving substrate;

using the data to measure the position of the surface of the coating and the position of the exposed surface of the continuously moving substrate during movement of the continuously moving substrate; and processing the data generated by the sensor means to determine the thickness of the coating and the determined thickness is used to adjust the coating continuously applied if the coating continuously applied is not within a desired range of thickness.

14. The method according to claim 13 further comprising the steps of:

determining an optimized distance of the sensor from the surface of the coating and/or the surface of the continuously moving substrate for generation of the data indicative of the position of the surface of the coating and the position of the surface of the substrate;

if the position of the sensor differs from the determined optimized distance, moving the sensor to the optimized distance from the surface of the coating and/or the surface of the substrate; and generating the data while the sensor is located at the optimized distance from the surface of the coating and/or the surface of the substrate.

15. The method according to claim 13 comprising forming the groove in the coating by the partial removal of the coating, the surface of the substrate being exposed within the groove, and measuring the position of the surface of the substrate within the groove.

16. The method according to claim 15 wherein an ablation laser is used to form the groove in the coating.

17. The method according to claim 13 comprising measuring the position of at least one of the surface of the coating and the surface of the continuously moving substrate at a number of different locations on the coating and/or the moving substrate and using the measurement for the determination of the thickness of the coating.

18. The method according to claim 17 wherein data comprise average values indicative of the position of the surface of the coating and/or the position of the surface of the continuously moving substrate.

19. The method according to claim 13 wherein the sensor comprises at least one displacement sensor for emitting and detecting the signals reflected from the surface of the coating and from the surface of the continuously moving substrate.

20. The method according to claim 13 wherein the continuously moving substrate travels at a speed of 10 meters per minute or greater during the generation of the data by the sensor.

21. The method according to claim 13 wherein the continuously moving substrate comprises metal strip.

22. The method according to claim 13 wherein the coating comprises paint.

* * * * *